United States Patent [19]

Wendel

[11] Patent Number: 4,497,463
[45] Date of Patent: Feb. 5, 1985

[54] SINGLE-HANDEDLY FLIPPABLE BAG HOLDER

[75] Inventor: Rainer Wendel, Berlin, Fed. Rep. of Germany

[73] Assignee: Susanne Spilker, Berlin, Fed. Rep. of Germany

[21] Appl. No.: 506,681

[22] Filed: Jun. 22, 1983

[51] Int. Cl.³ .............................................. B65B 67/12
[52] U.S. Cl. ....................................... 248/95; 248/101
[58] Field of Search ...................... 248/95, 97, 99, 100, 248/101; 53/390; 141/391, 390; 150/51

[56] References Cited

U.S. PATENT DOCUMENTS

| | | | |
|---|---|---|---|
| 3,218,014 | 11/1965 | Frazier | 53/390 UX |
| 3,818,956 | 6/1974 | Chamberlain | 141/390 X |
| 3,841,592 | 10/1974 | Witten | 248/97 X |
| 4,223,858 | 9/1980 | De Salazar | 248/101 |
| 4,304,379 | 12/1981 | Christensen | 248/101 |
| 4,411,300 | 10/1983 | Rico | 150/51 |

FOREIGN PATENT DOCUMENTS

| | | | |
|---|---|---|---|
| 360427 | 5/1980 | Austria | |
| 1410343 | 8/1965 | France | 248/99 |

Primary Examiner—J. Franklin Foss
Attorney, Agent, or Firm—Karl F. Ross

[57] ABSTRACT

A holder for a waste-disposal bag, to be installed in a confined space such as the interior of a passenger automobile, has a mounting bracket secured to an upright wall to which a rectangular frame is articulated for swinging about a horizontal pivotal axis from a depending position into a level position in which it is arrested by a stop. A lid overlying the frame is biased by a torsion spring into a closure position and has an edge portion projecting beyond the frame engageable by a user's finger for swinging the frame from its depending position into its level position and, thereupon, lifting the lid off the frame in the same motion to give access to a bag suspended from a rectangular insert inside the frame. The insert, which like the frame and its lid consists of plastic material, is resiliently indexed in the frame and rests against internal abutments thereof which are integral with a ledge forming an abutment for the torsion spring. A plastic pin with a barb passes through two lugs in the lid and through a sidewall of the frame to form one of two pivots for the lid, locking itself onto one of these lugs.

7 Claims, 5 Drawing Figures

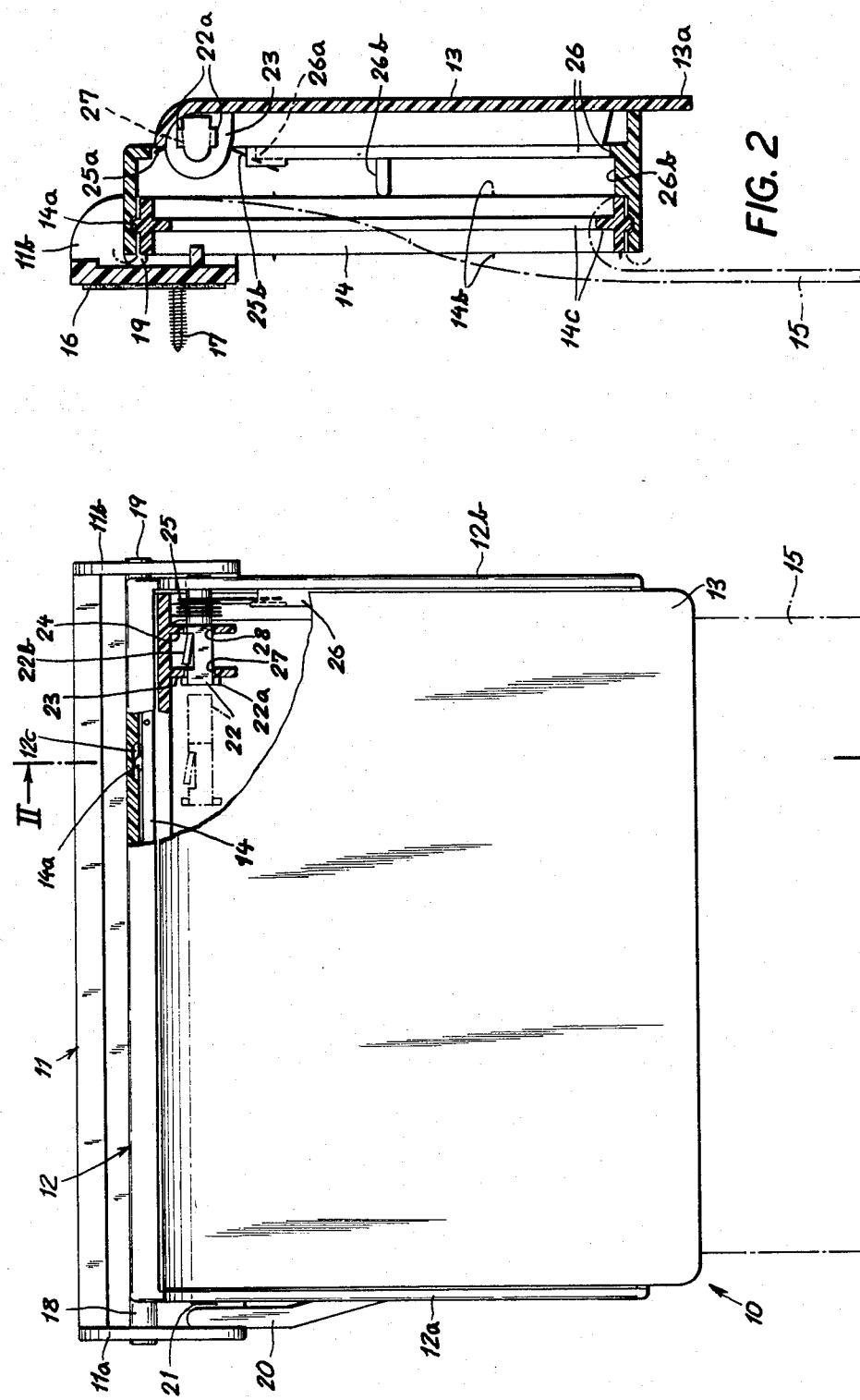

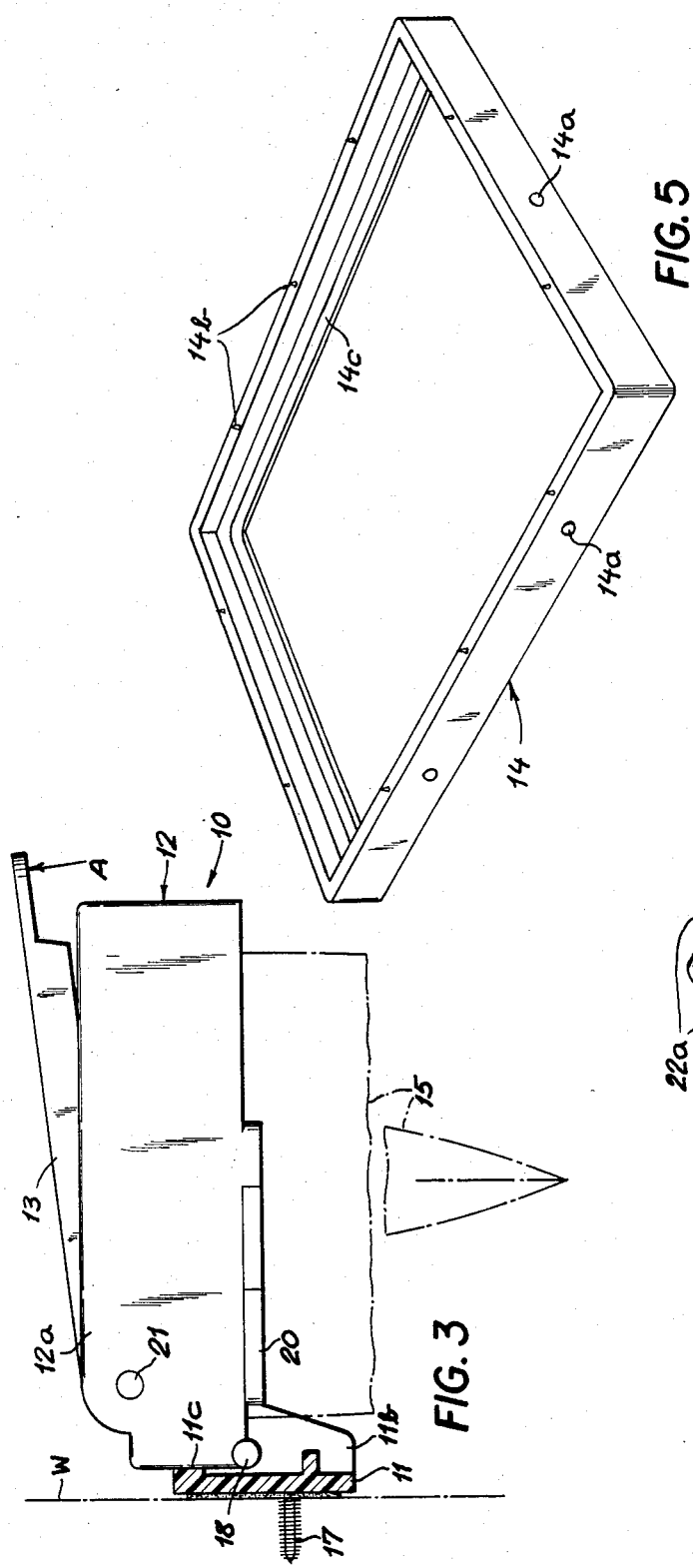

SINGLE-HANDEDLY FLIPPABLE BAG HOLDER

FIELD OF INVENTION

My present invention relates to a holder for waste-disposal bag which is designed to be installed in a confined space, such as the interior of a passenger automobile, so as normally to protrude but slightly from a wall or other support on which it is mounted.

BACKGROUND OF THE INVENTION

A bag holder of this general type is disclosed in U.S. Pat. No. 3,841,592. According to that patent, a circular hoop is designed to engage the open end of a bag and is hinged to a supporting bracket so as to be swingable between a substantially vertical depending positon and a substantially horizontal utilization position. In the latter position, a cover normally overlying the hoop can be lifted off to give access to the bag.

A more refined version of such a bag holder, adapted to be installed in an automotive vehicle, is the subject matter of Austrian Pat. No. 360,427 issued Jan. 12, 1981. The holder described in this Austrian patent comprises a rectangular frame articulated to a mounting bracket and provided with a generally rectangular lid biased by a torsion spring into a closure position in which it is in all-around contact with the frame. An edge portion of the lid projects in this closure position beyond the frame and can be pushed by finger pressure to swing the frame from its depending position into its utilization position in which that frame is arrested by the mounting bracket. Continuing finger pressure then lifts the lid off the frame, against the force of the torsion spring, in order to give access to the upwardly facing open end of a bag suspended from a rectangular or square insert within the frame. This construction, accordingly, enables a user—such as the driver of a vehicle—to flip the frame and its lid with one hand from a withdrawn position into a position in which the bag is uncovered and accessible to receive small items of waste to be dropped into it with the same hand.

According to the description of the Austrian patent, the mounting bracket preferably consists of aluminum while the frame, the insert and the lid are made of plastic material. Indexing pins serving to retain the insert in the frame are described as metallic. Also shown as metallic is a throughgoing horizontal shaft which traverses an enlargement of the lid and serves as a fulcrum for the latter. The patent does not indicate by what means, if any, this shaft is prevented from accidentally sliding out of the holes in the sidewalls of the frame in which its ends are presumably received. Nor is it apparent how the torsion spring is anchored to the lid since only a stud on one of the sidewalls, engaged by a leg of that spring, has been illustrated.

OBJECTS OF THE INVENTION

The general object of my invention is to provide an improved bag holder of the type described and shown in the above-identified Austrian patent.

A more particular object is to provide simple and reliable means for articulating a lid of such a holder to its frame without the need for a throughgoing metallic shaft but only with elements molded from plastic material.

SUMMARY OF INVENTION

In accordance with my present invention, the lid covering the pivoted frame of the holder is provided with a pair of hinge pins of resilient material projecting through respective holes in the sidewalls of the frame and defining a horizontal swing axis for that lid, one of these hinge pins being rigid with the lid while the other hinge pin traverses a bore in a lug of the lid projecting into the interior of the frame in the vicinity of one sidewall. The latter hinge pin has a barb and a head which bear upon opposite sides of the lug penetrated thereby for substantially immobilizing this pin relatively thereto.

By this means, the lid and the frame can be easily assembled and could also be separated again with repression of the barb but will normally remain connected in the face of the various kinds of shock to which such a device may be subjected when installed in an automotive vehicle.

According to another feature of my invention, the insert designed to engage the bag comes to rest against internal abutments of the frame, helping to hold the engaged bag in place, upon being introduced into the frame from the bottom thereof (as viewed in the utilization position), the insert being preferably indexed within the frame with the aid of at least two integral protuberances on each major side of its rectangular outline which are receivable in respective peripheral depressions of the frame. The abutments, advantageously, are pronglike downward extensions of an inner peripheral ledge of the frame which also serves as an anchor for one of the legs of a torsion spring that is wound about the barbed hinge pin and biases the lid into its closure position. Thus, if the torsion spring should fail, it could be readily replaced by another spring upon retraction of the hinge pin on which it is wound.

BRIEF DESCRIPTION OF THE DRAWING

The above and other features of my invention will now be described in detail with reference to the accompanying drawing in which:

FIG. 1 is a front-elevational view (parts broken away) of a bag holder according to my present invention, shown in its depending or withdrawn position;

FIG. 2 is a cross-sectioned view taken on the line II—II of FIG. 1;

FIG. 3 is a side view of the frame of the bag holder in its utilization position;

FIG. 4 is a perspective view of a hinge pin serving to articulate the frame of the bag holder to its lid; and FIG. 5 is a perspective view of an insert receivable in that frame.

SPECIFIC DESCRIPTION

In the drawing I have shown in single-handedly flippable bag holder according to my invention, generally designated 10, whose major constituents are a mounting bracket 11, a rectangular frame 12 pivoted to this bracket for swinging about a horizontal pivotal axis, a lid 13 articulated to frame 12, and a rectangular insert 14 removably indexed in frame 12 in order to retain therein a waste-disposal bag 15 partly indicated in phantom lines in FIGS. 1–3. All these parts are made of a somewhat resilient plastic material such as polypropylene, for example.

Bracket 11 is shown provided with an adhesive strip 16 by which it can be bonded onto a supporting wall shown schematically at W in FIG. 3, e.g. a door or a dashboard of a passenger car. Additional fastening means include several screws 17 (only one shown) adapted to be threaded into that wall.

The pivotal connection between frame 12 and bracket 11 comprises a pair of pintles 18 and 19 molded integral with the frame, these pintles being received in two horizontally aligned holes of cheeks 11a, 11b of the bracket. A certain axial separation of cheek 11a from an adjoining sidewall 12a of frame 12 enables that frame to be detached from bracket 11 upon a relative leftward shift, as viewed in FIG. 1, against the force of a resilient tongue 20 which laterally projects from frame 12 and bears upon cheek 11a. This feature is known per se from the above-identified Austrian patent and, therefore, is not part of my present invention.

Lid 13 is provided with two hinge pins 21 and 22, parallel to pintles 18 and 19, which pass through horizontally aligned holes in sidewalls 12a, 12b of frame 12 to define a horizontal swing axis for that lid paralleling the pivotal axis of the frame defined by the two pintles. Hinge pin 21 is rather short and rigid with lid 13 whereas hinge pin 22 is considerably longer and passes through two somewhat elongated apertures 27, 28, aligned with two holes in sidewalls 12a, 12b, which are formed in a pair of lugs 23, 24 integral with the lid; these lugs project into the interior of frame 12 in the vicinity of its sidewall 12b as seen in FIGS. 1 and 2. FIG. 1 shows the hinge pin 22 in full lines in its working position and in phantom lines in a retracted position in which it enables the lid 13 to be tilted sufficiently to let the other hinge pin 21 be extracted from sidewall 12a. Pin 22, as more clearly shown in FIG. 4, has a head formed by lateral bosses 22a and further has a barb 22b which is biased outward at an acute angle so as to adjoin the solid portion of lug 23 when the pin is inserted into that lug from the left as viewed in FIG. 1. Upon such insertion, head 22a rests against the left-hand side of lug 23 whose right-hand side confronts the barb 22b whereby the pin is virtually immobilized in axial direction with reference to lid 13 while its free end protrudes through the hole of sidewall 12b. Before pin 22 is fully driven home, that free end is introduced into a torsion spring 25 disposed between lug 24 and sidewall 12b; one leg 25a of spring 25 bears upon a rear edge of lid 13 while another leg 25b is received in a recess 26a of an inner ledge 26 formed integral with frame 12 on three sides of its periphery. Thus, spring 25 tends to keep the lid in the closure position illustrated in FIGS. 1 and 2.

Ledge 26, aside from serving as an anchor for torsion spring 25, is provided with a plurality of peripherally spaced prongs 26b which act as abutments for insert 14 when the latter is resiliently retained inside frame 12 with the aid of peripheral protuberances 14a receivable in depressions 12c of frame 12 as seen in FIGS. 1 and 2. This insert, which is also frame-shaped, is symmetrical about a midplane including its rectangular outline (i.e. a plane which is vertical in the position of FIG. 2 and horizontal in the position of FIG. 3) so that it can be indifferently introduced, along with a new bag, from below into the leveled frame 12 (FIG. 3) in its illustrated position or in a reversed position; that midplane bisects a central peripheral reinforcing rib 14c. Spines 14b, peripherally offset from prongs 26b, project from insert 14 in both directions so that one of the other set of spines will penetrate the rim of bag 15 folded around that insert before its introduction into the frame 12; this, together with the clamping effect exerted by the prongs 26b and the adjoining edges of the insert, insures a firm engagement of the insert with the bag.

In the manner taught by the Austrian patent referred to, lid 13 has a forward edge portion 13a projecting beyond the frame 12 to let the user (e.g. the driver of a car) engage the lid with one finger in the depending position of FIGS. 1 and 2 for flipping the frame 12 into its utilization position of FIG. 3 and, by continuing finger pressure as indicated by an arrow A in FIG. 3, extend the clockwise swing of the lid 13 to expose the mouth of bag 15 as the frame 12 is arrested by a stop 11c of bracket 11. When the user has dropped a disposable item into the bag and releases the lid, the latter is returned by the torsion spring 25 into its closure position while the frame 12 drops back under its own weight, to the extent premitted by the contents of bag 15, toward the withdrawn position of FIGS. 1 and 2.

I claim:

1. A holder for a waste-disposal bag, comprising:
   a bracket fixedly mounted on an upright support;
   a rectangular frame articulated to said bracket for swinging about a horizontal axis between a depending withdrawn position and a substantially level utilization position, said bracket being provided with stop means arresting said frame in said utilization position, said frame having sidewalls provided with a pair of aligned holes offset from said pivotal axis;
   a lid overlying said frame and having a lug projecting into the interior of said frame in the vicinity of one of said sidewalls, said lug having an aperture aligned with said holes;
   a pair of hinge pins of resilient material on said lid respectively projecting through said holes and defining a horizontal swing axis for said lid, one of said hinge pins being rigid with said lid, the other of said hinge pins traversing said aperture and being provided with a barb and a head bearing upon said lug from opposite sides for substantially immobilizing said other of said hinge pins relatively to said lug in an axial direction;
   spring means anchored to said frame and to said lid for biasing the latter into a closure position in all-around contact with said frame, said lid having an extension projecting beyond said frame in said closure position for enabling a user to swing said frame about said pivotal axis from said depending position into said utilization position and thereupon lifting said lid off said frame in a continuing swing motion against the force of said spring means; and
   a removable rectangular insert resiliently fitted into said frame for supporting a bag with an open end facing upward in said utilization position.

2. A holder as defined in claim 1 wherein said frame is provided with internal abutments, said insert resting against said abutments in said utilization position, said abutments being adapted from below to clamp a rim of said bag against said insert.

3. A holder as defined in claim 2 wherein said frame is provided with an inner peripheral ledge integral with said abutments, said spring means comprising a torsion spring wound about said other of said pins and provided with two legs respectively bearing upon said ledge and said lid.

4. A holder as defined in claim 3 wherein said insert is symmetrical about a midplane including its rectangular outline and is provided with spines projecting therefrom on opposite sides of said midplane for penetrating said bag, said abutments being prongs peripherally offset from the locations of said spines.

5. A holder as defined in claim 1 wherein said ledge has a recess accommodating one of said legs.

6. A holder as defined in claim 1 wherein said bracket, said frame, said lid, said insert and said hinge pins consists of plastic material.

7. A holder as defined in class 6 wherein said insert is provided with on each major side of its rectangular outline with at least two integral protuberances receivable in respective peripheral depressions of said frame for indexing said insert close to said abutments.

* * * * *